United States Patent
Fanelli et al.

(10) Patent No.: US 6,539,837 B2
(45) Date of Patent: Apr. 1, 2003

(54) APPARATUS AND METHOD OF ATTACHING A CONNECTING MEMBER AND A TUBE MEMBER TO A HOUSING OF A VACUUM BRAKE BOOSTER

(75) Inventors: Michael William Fanelli, Centerville, OH (US); William Lee Van Doren, Miamisburg, OH (US); Philippe Georges Castel, Paris (FR)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/860,168

(22) Filed: May 17, 2001

(65) Prior Publication Data

US 2002/0170427 A1 Nov. 21, 2002

(51) Int. Cl.⁷ ................................................. F01B 11/02
(52) U.S. Cl. ........................................................ 92/169.3
(58) Field of Search ........................... 92/169.2, 169.3, 92/169.4; 91/376 R (56) References Cited

U.S. PATENT DOCUMENTS 5,410,880 A * 5/1995 Schluter ..................... 92/169.3
6,186,050 B1 * 2/2001 Verbo et al. ................ 92/169.3
6,314,865 B1 * 11/2001 Henein et al. .............. 92/169.3

* cited by examiner

*Primary Examiner*—Edward K. Look
*Assistant Examiner*—Thomas E. Lazo
(74) *Attorney, Agent, or Firm*—Robert M. Sigler (57) ABSTRACT

A connecting member and method of attaching the connecting member and a tube member to a housing of a vacuum brake booster is provided. The connecting member includes a cylindrical body portion having a first end and a second end. A rim portion is formed between the first end and the second end, and a stem portion is formed at the second end of the cylindrical body portion. The stem portion includes a tapered end portion to allow the stem portion to flow radially outward when a force is applied to the stem portion. The cylindrical body portion further includes a first opening formed in the cylindrical body portion adjacent to the first end of the cylindrical body portion and a second opening in communication with the first opening. The first opening has a first diameter and the second opening has a second diameter. The second diameter is less than the first diameter. The stem portion is deformed to create a seal between a portion of a housing member and the connecting member. A tube member includes a first end portion that is received in the first opening of the cylindrical body portion.

15 Claims, 10 Drawing Sheets

APPARATUS AND METHOD OF ATTACHING A CONNECTING MEMBER AND A TUBE MEMBER TO A HOUSING OF A VACUUM BRAKE BOOSTER

TECHNICAL FIELD

This invention relates generally to the field of vacuum brake boosters for cars or light trucks, and in particular, to an apparatus and method of attaching a connecting member and a tube member to a housing of a vacuum brake booster.

BACKGROUND OF THE INVENTION

Vacuum brake boosters are typically used in automobiles and light trucks. They typically include a housing that includes a front side and a rear side. The rear side is typically attached to the firewall of the vehicle, while the front side provides an attachment for a master-cylinder. In order to fasten the vacuum booster to the firewall, rigid tubular members are provided, which extend through the front side of the housing, through the interior of the booster, and through the rear of the housing. Fastening bolts can then be inserted into the tubular members to allow the booster to be attached to the firewall.

Figure 10:
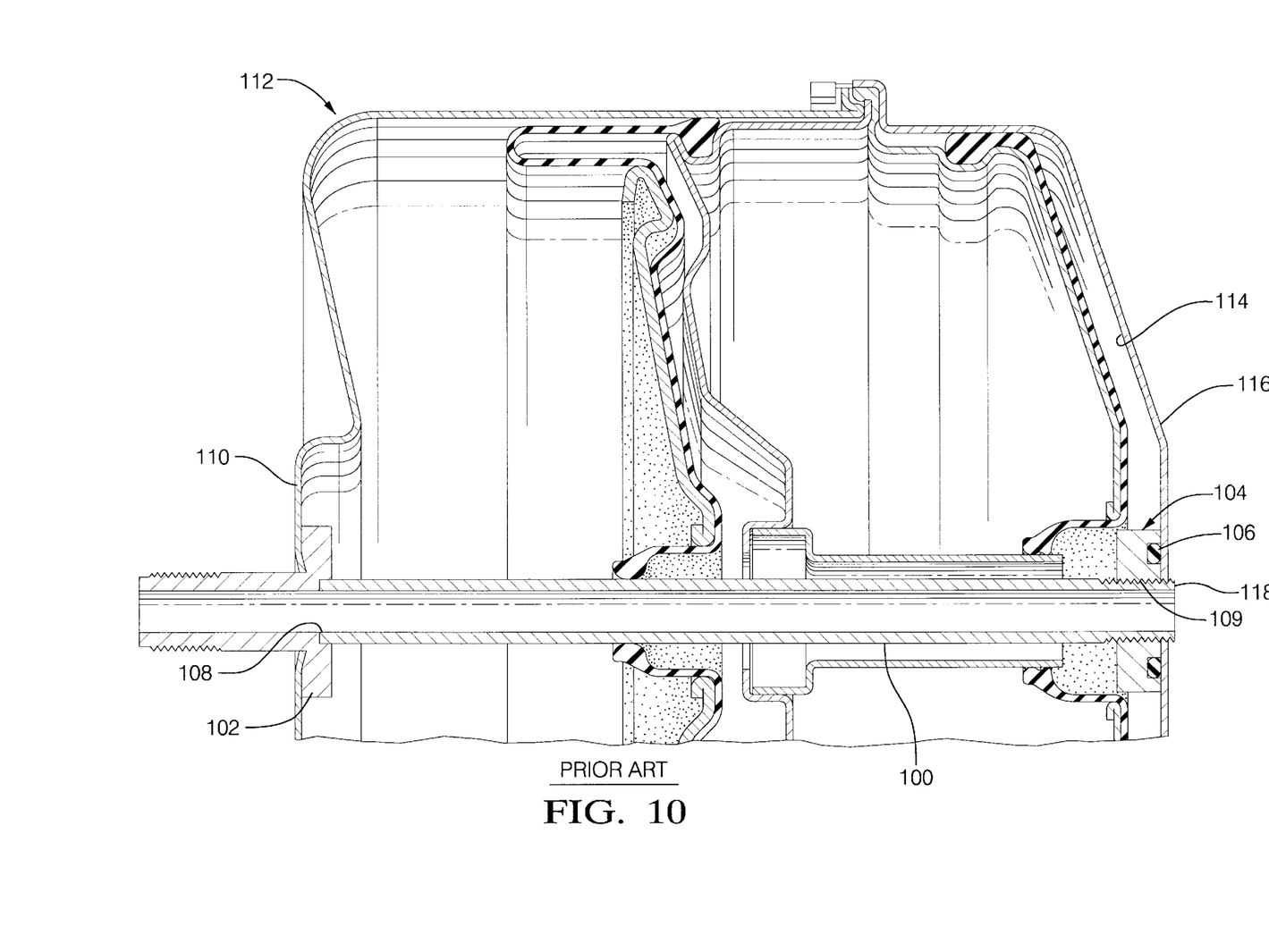
FIG. 10 is a sectional view of a conventional arrangement for attaching and sealing a tube member to the housing of a vacuum brake booster.

Various arrangements are known for attaching a tubular member to the housing of a vacuum brake booster. An example of a conventional arrangement is shown generally in FIG. 10. As shown in FIG. 10, at least four parts are required: namely, a tubular member 100, a fitting 102, a nut 104 and a seal 106. One end 108 of the tubular member 100 is connected and sealed to the front side 110 of a housing 112 via the fitting 102 by slightly deforming the metal structure of the fitting 102. That is, the one end 108 of the tubular member 100 is crimped against the fitting 102, which itself is crimped against the front side 110 of the housing 112. The nut 104 and the seal 106 are positioned adjacent to an inner surface 114 of a rear side 116 of the housing 112. The nut 104 and seal 106 facilitate the connection and sealing of a second end 118 of the tubular member 100 to the rear side 116 of the housing 112. EP 0 623 081, for example, discloses a similar arrangement for attaching and sealing a tubular member to the front housing of a vacuum brake booster.

There are several disadvantages to this arrangement, including the number of parts required (i.e. the nut 104, and the seal 106). The increased number of parts in turn increases the costs associated with the vacuum brake booster. Moreover, the installation of these parts is a labor intensive and time-consuming process, which also increases the costs associated with installing the booster. In addition to the above, the crimping arrangement associated with the fitting 102 and the front side 110 of the housing 112 cannot be implemented to flush mount a rear side of a booster housing to a firewall due to the interference that would caused by the threaded fitting 102.

Figure 11:
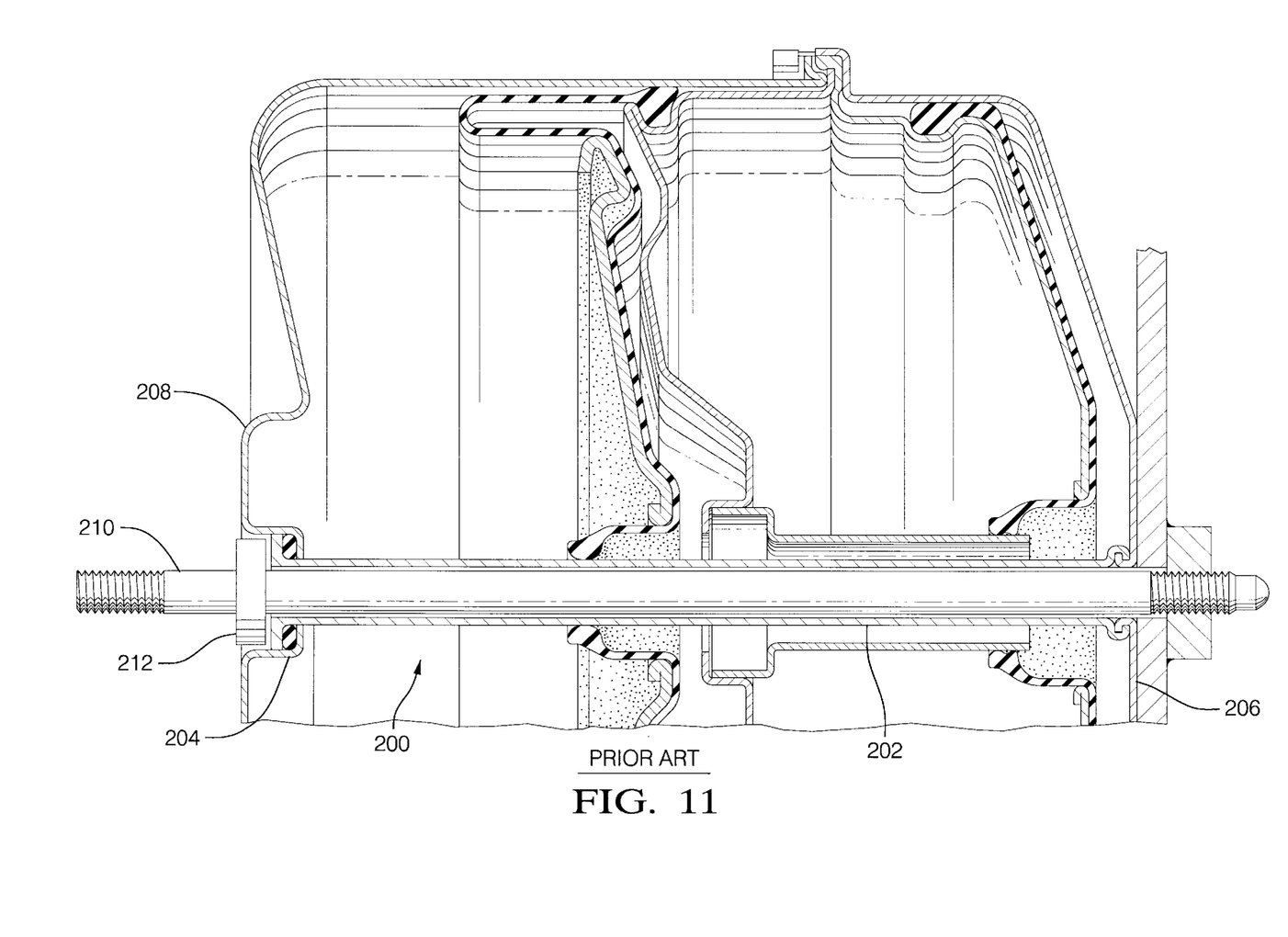
FIG. 11 is a sectional view of another conventional arrangement for attaching and sealing a tube member to a housing of a vacuum brake booster.

Another example of a conventional apparatus is shown in FIG. 11. As shown in FIG. 11, the tubular member 200 consists of a first tube portion 202 and a second tube portion 204. The first tube portion 202 is linked mechanically to a rear housing 206 and the second tube portion 204 is mechanically linked to a front housing 208. The bolt 210 may extend through the tubular member 200 from the front housing 208 to the rear housing 206. A flange 212 positioned adjacent to an end of the bolt 210 prevents the master-cylinder from compressing the booster. EP 0 331 535, for example, discloses a similar arrangement for providing a tubular member in a vacuum brake booster.

There are also several disadvantages to this arrangement. For example, it is very impractical and difficult to manufacture and assemble the first and second tube portions 202, 204 so that they are a part of the housings 206, 208, respectively. This arrangement is also likely to require additional parts. The large number of parts required, and the complexity of the interconnections between parts, also results in increased costs.

Figure 12:
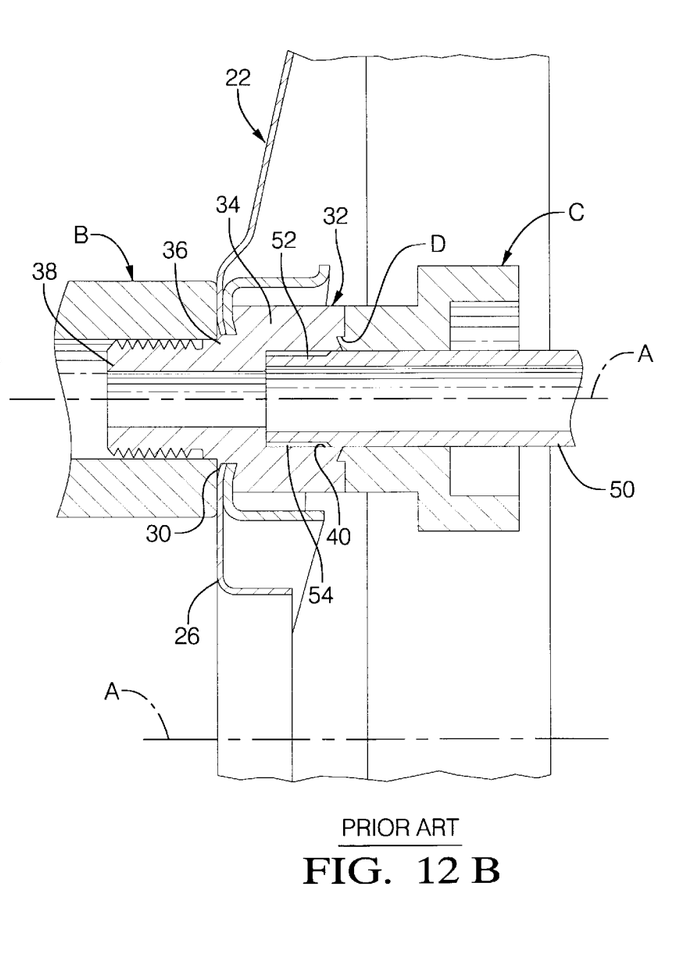
FIGS. 12A–12B are sectional views of yet another conventional arrangement for attaching and sealing a tube member to a housing of a vacuum brake booster.

Another example of an apparatus and method of assembling a brake booster is shown in U.S. Pat. No. 5,487,327 ("the '327 patent"). FIGS. 2 and 3 from the '327 patent are reproduced herein as FIGS. 12A and 12B. As shown in FIGS. 12A–12B, the booster housing is assembled by first inserting an end portion 52 of the spacer 50 (i.e. tubular member) into a recess 40 of a connecting member 32. The connecting member 32 is then passed through a fastening hole 30. The two tool members B and C are compressed, which simultaneously crimps the connecting member 32 with the housing 26 and the spacer 50. FIG. 12A shows the apparatus before crimping, while FIG. 12B shows the apparatus after crimping. The disadvantage of this arrangement is that it cannot be used to mount a rear side of a booster housing flush with the firewall of the vehicle.

Accordingly, it would be desirable to have an apparatus and method of attaching a connecting member and a tube member to a housing of a vacuum brake booster that overcomes the disadvantages described.

SUMMARY OF THE INVENTION

One aspect of the invention provides a connecting member including a cylindrical body portion having a first end and a second end. A rim portion is formed between the first end and the second end, and a stem portion is formed at the second end of the cylindrical body portion. The stem portion includes a tapered end portion to allow the stem portion to flow radially outward when a force is applied to the stem portion. The cylindrical body portion further includes a first opening formed in the cylindrical body portion adjacent to the first end of the cylindrical body portion for receiving an end portion of tube member. The cylindrical body portion also includes a second opening in communication with the first opening. The first opening has a first diameter and the second opening having a second diameter, the second diameter being less than the first diameter. The stem portion is adapted to be deformed to create a seal between a portion of a housing member and the connecting member. The rim portion and the stem portion may preferably define a recess to receive the housing member. The rim portion may preferably extend outward from the cylindrical body portion in a direction towards the second end. In particular, the rim portion may preferably extend outward from the cylindrical body portion approximately 25 degrees from vertical. The cylindrical body portion may be formed from a single piece of rigid material.

Another aspect of the invention provides a vacuum brake booster including a housing member and a connecting member including a cylindrical body portion. The cylindrical body portion includes a first end and a second end. A rim portion is formed between the first end and the second end, and a stem portion is formed at the second end of the cylindrical body portion. The stem portion includes a tapered end portion to allow the stem portion to flow radially outward when a force is applied to the stem portion. The cylindrical body portion further includes a first opening formed in the cylindrical body portion adjacent to the first end of the cylindrical body portion. The cylindrical body portion also includes a second opening in communication with the first opening. The first opening has a first diameter and the second opening has a second diameter. The second diameter is less than the first diameter. The stem portion is deformed to create a seal between a portion of a housing member and the connecting member. A tube member includes a first end portion, which is received in the first opening of the cylindrical body portion. An outer surface of the stem portion may preferably be flush with an outer surface of the housing member.

Another aspect of the invention provides a method of attaching a connecting member to a housing member of a vacuum brake booster. The connecting member includes a cylindrical body portion having a first end and a second end. A rim portion is formed between the first end and the second end, and a stem portion is formed at the second end of the cylindrical body portion. The stem portion includes a tapered end portion. The cylindrical body portion further includes a first opening formed in the cylindrical body portion adjacent to the first end of the cylindrical body portion. The cylindrical body portion also includes a second opening in communication with the first opening. The first opening has a first diameter and the second opening has a second diameter, the second diameter being less than the first diameter. The housing member includes an inner surface, an outer surface, and a housing member opening formed therein. The stem portion is inserted through the housing member opening, and the rim portion is contacted against the housing member. The rim portion may preferably be contacted against the inner surface of the housing member. A force is applied to the stem portion. The stem portion flows radially outward thereby deforming the stem portion to create a seal between a portion of the housing member and the connecting member. A force may preferably be applied to the tapered end portion of the stem portion. The rim portion and the stem portion may preferably define a recess, and the portion of the housing member may preferably be deflected into the recess. The portion of the housing member may preferably be contacted against the rim portion, and the stem portion may preferably be contacted against the portion of the housing member. The stem portion may preferably be contacted against the outer surface of the housing member.

Another aspect of the invention provides a method of attaching a tube member to a housing member of a vacuum brake booster. A connecting member including a cylindrical body portion having a first end and a second end is provided. A rim portion is formed between the first end and the second end, and a stem portion is formed at the second end of the cylindrical body portion. The stem portion includes a tapered end portion. The cylindrical body portion further includes a first opening formed in the body portion adjacent to the first end of the cylindrical body portion, and a second opening in communication with the first opening. The first opening has a first diameter and the second opening has a second diameter, the second diameter being less than the first diameter. The tube member includes a first end portion. The housing member includes an inner surface, an outer surface, and a housing member opening formed therein. The stem portion is inserted through the housing member opening, and the rim portion is contacted against the housing member. The first end portion of the tube member is inserted into the first opening in the cylindrical body portion. A force is applied to the stem portion. The stem portion flows radially outward thereby deforming the stem portion to create a seal between a portion of the housing member and the connecting member. The rim portion is deformed against the first end portion of the tube member to fasten the tube member to the cylindrical body portion. The rim portion may preferably be deformed against the first end portion of the tube portion simultaneously with the deformation of the stem portion. A staking tool may also be provided, and may be positioned around the tube member. The first end of the cylindrical body portion my preferably be contacted against the staking tooling.

DESCRIPTION OF THE PREFERRED EMBODIMENT

Figures 1, 2:
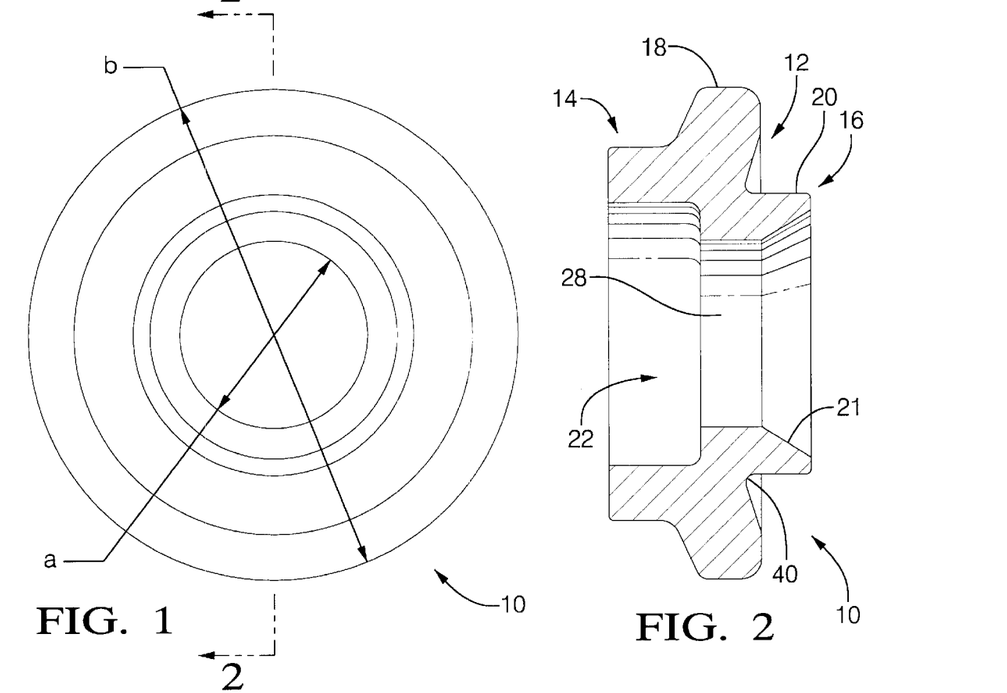
FIG. 1 is an end view of a preferred embodiment of a connecting member that is made in accordance with the invention.
FIG. 2 is a sectional view of the connecting member of FIG. 1 taken along line 2—2 of FIG. 1.
Figure 4:
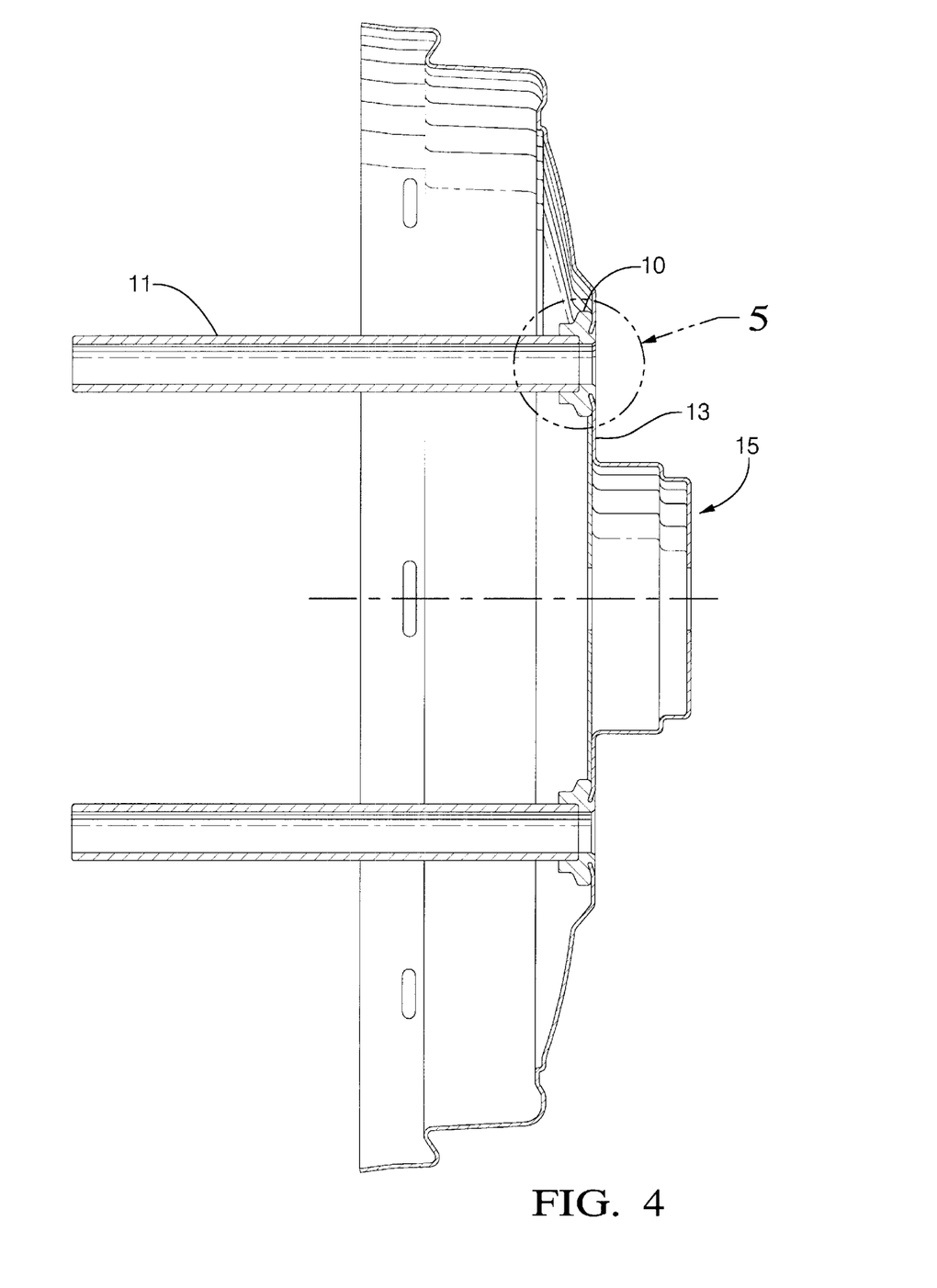
FIG. 4 is a sectional view a housing assembly of a vacuum brake booster.

FIGS. 1 and 2 illustrate a preferred embodiment of a connecting member 10 that is made in accordance with the invention. Connecting member 10 is used to allow a tube member 11 to be attached to a housing member 13 of a vacuum brake booster 15 as illustrated in FIG. 4. Referring again to FIGS. 1–2, and in particular FIG. 2, the connecting member 10 includes a cylindrical body portion 12 having a first end 14 and a second end 16. A rim portion 18 is formed between the first end 14 of the body portion 12 and the second end 16 of the body portion 12. A stem portion 20 is formed at the second end 16 of the body portion 12. The stem portion 20 includes a tapered end portion 21. As discussed more fully below, the tapered end portion 21 allows the stem portion 20 to flow radially outward when a force is applied to the stem portion 20.

Figure 9:
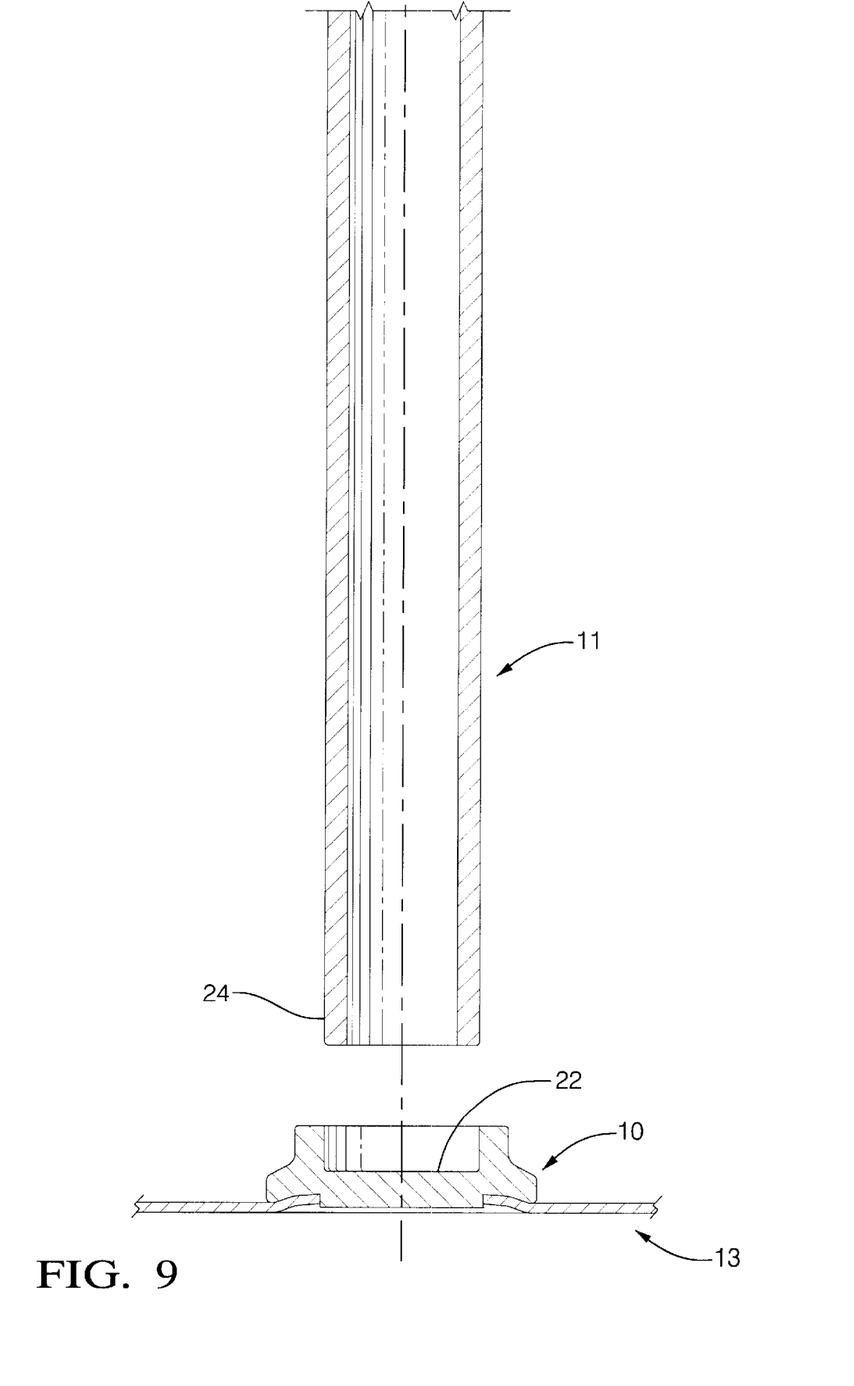
FIG. 9 is a sectional view illustrating a method of attaching the tube member to the connecting member by press-fitting the tube member into the connecting member.

The cylindrical body portion 12 further includes a first opening 22 located adjacent to the first end 14 of the body portion 12. As shown in FIG. 9, the first opening 22 is adapted to receive an end portion 24 of the tube member 11.

Figure 5:
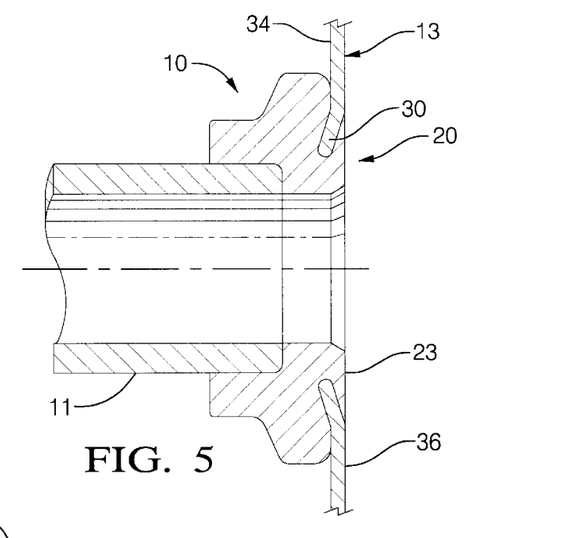
FIG. 5 is enlarged view of the circled region A shown in FIG. 4.

Referring again to FIG. 2, a second opening 28 is in communication with the first opening 22. The first opening 28 has a first diameter and the second opening 28 has a second diameter. In the embodiment shown, the second diameter is less than the first diameter. FIG. 4 shows the connecting member 10 attached to the housing member 13, and the tube member 11 attached to the connecting member 10. As shown in FIG. 5, the stem portion 20 is adapted to be deformed to create a seal between a portion 30 of the housing member 13 and the connecting member 10.

The housing member 13 shown in FIG. 4 may preferably be a housing member for a vacuum brake booster 15. Although the housing member 13 disclosed herein is referenced as a housing member for a vacuum brake booster 15, it should be understood by those of ordinary skill in the art that the connecting member 10 may be attached to a wide variety of other types of housing members. In the embodiment shown in FIGS. 6A–6D, the housing member 13 includes an inner surface 34, an outer surface 36, and an opening 38 (see FIG. 6A) formed therein. As shown in FIGS. 4, 5, and 6A–6D, the housing member 13 may preferably include a generally planar region where the connecting member 10 is attached the housing member 13.

The tube member 11 is shown in FIGS. 4, 5, 8A–B and 9. As shown in FIG. 4, the tube member 11 is elongated so as to extend from the housing member 13 to a second housing member, not shown, of the vacuum brake booster 15. The tube member 11 provides a passageway to allow a bolt or any other structure capable of transmitting a reaction force, to pass through the booster 15. For example, the tube member 11 may be used to route electrical wires, hydraulic lines, or other materials. Alternatively, the passageway may remain empty in order to provide a means for communication between component parts. The tube member 11 referenced herein may preferably be any hollow member, and may be comprised of any suitable rigid material such as, for example, steel or aluminum.

Referring again to FIGS. 2 and 6A, the rim portion 18 and the stem portion 20 may preferably define a recess 40 to receive the housing member 13. As shown in FIG. 2, the rim portion 18 may preferably extend outward from the body portion 12 in a direction towards the second end 16. In the embodiment shown, for example, the rim portion 18 may preferably extend outward from the body portion 12 approximately 25 degrees from vertical. However, the rim portion 18 may preferably extend outward from the body portion 12 at various other angles such as, for example, 30 degrees or 45 degrees depending upon the particular application. The body portion 12 may preferably be formed from a single piece of rigid material such as, for example, metal or steel.

Figure 3:
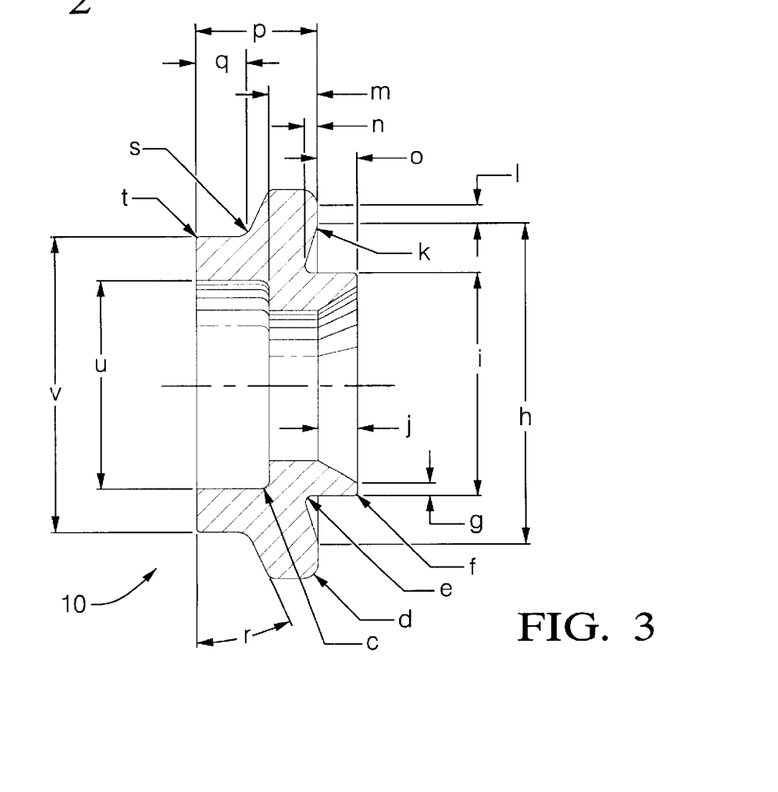
FIG. 3 is a sectional view of the connecting member of FIG. 1 that is used for providing dimensions of the connecting member.

As shown in FIG. 1, the dimensions (in millimeters) for the connecting member 10 may preferably be a=9.00, b=22.50. FIG. 3 illustrates additional dimensions (again in millimeters) for the connecting member 10 as follows, c=R 0.5, d=R 1.00, e=R 0.2–0.5, f=R 0.25, g=0.80, h=19.00, I=12.95–13.05, j=, 2.25, k=R 2.5, 1=0.75, m=2.7–2.8, n=0.65–0.85, o=2.13–2.37, p=6.85–7.15. q=3.00, r=25 degrees, s=R 0.75, t=R 0.25, u=12.545–12.595, v=17.60. It should be understood of ordinary skill in the art that the dimensions may vary depending upon the particular application.

Figure 6A:
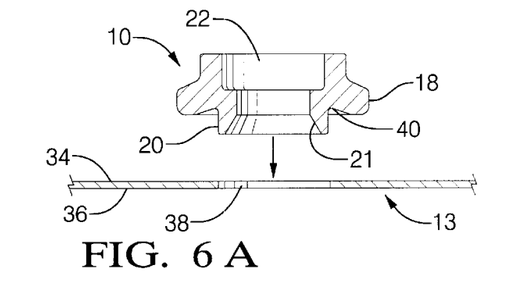
FIGS. 6A–6D illustrate a method of attaching the connecting member shown in FIGS. 1 and 2 to a housing of a vacuum brake booster.
Figure 6B:
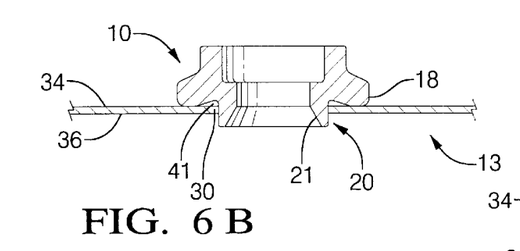
Figure 6C:
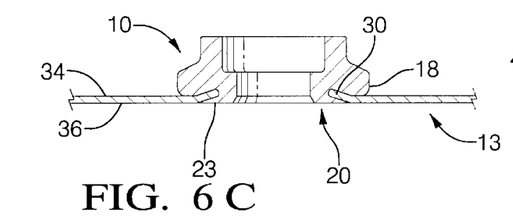

FIGS. 6A–6D illustrate a method of attaching the connecting member 10 to the housing member 13 of the vacuum brake booster 15 (see FIG. 4). As shown in FIG. 6A, the stem portion 20 of the connecting member 10 is inserted through the housing member opening 38. As shown in FIG. 6B, the rim portion 18 is contacted against the housing member 13. In the embodiment shown, for example, the rim portion 18 is contacted against the inner surface 34 of the housing member 13. As shown in FIG. 6C, a support tool 42 may preferably be inserted into the first opening 22 of the connecting member 10. A form tool 44 may preferably be positioned opposite the support tool 42. The form tool 44 applies a force to the stem portion 20.

Figure 6D:
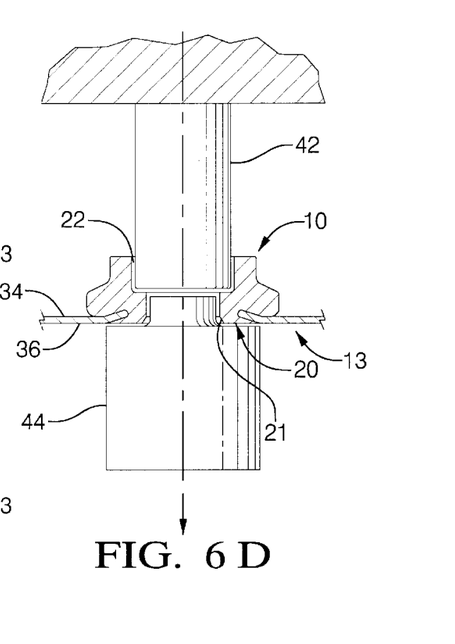

In the embodiment shown, for example, the force is applied to the tapered end portion 21 of the stem portion 20. The tapered end portion 21 allows the stem portion 20 to flow radially outward when the force is applied to the stem portion 20. As shown in FIG. 6D, the stem portion 20 is deformed to create a seal between a portion 30 of the housing member 13 and the connecting member 10. As shown in FIGS. 5 and 6D, once deformed, an outer surface 23 of the stem portion 20 is flush with the outer surface 36 of the housing member 13. The advantage of this arrangement is that the housing member 13 can be mounted flush to a firewall of the vehicle so that any loading on the housing member 13 is spread over a large area.

Referring again to FIG. 6B, when the rim portion 18 contacts the housing member 13, a space 41 is created that preferably has a volume that is equal to a volume of the stem portion 20 that is displaced into the space 41 after deformation of the stem portion 20. Also, when the force is applied to stem portion 20, the stem portion 20 deflects the portion 30 of the housing member 13 into the recess 41. As shown in FIG. 6D, the portion 30 of the housing member 13 is then contacted against the rim portion 18, and the stem portion 20 is contacted against the portion 30 of the housing member 13. In the embodiment shown, for example, the stem portion 20 is contacted against the outer surface 36 of the housing member 13.

One advantage of this arrangement is that a positive mechanical seal is formed between the connecting member 10 and the housing member 13. This is accomplished without requiring additional parts, which in turn greatly reduces the overall cost of the product. Moreover, the connecting member 10 provides an opening 22 to receive the tube member 11. As shown in FIG. 9, the tube member 11 can be press fitted into the opening 22 of the connecting member 10 quickly and easily, thus eliminating the labor intensive and time consuming installation process associated with conventional multi-component systems.

Figure 7A:
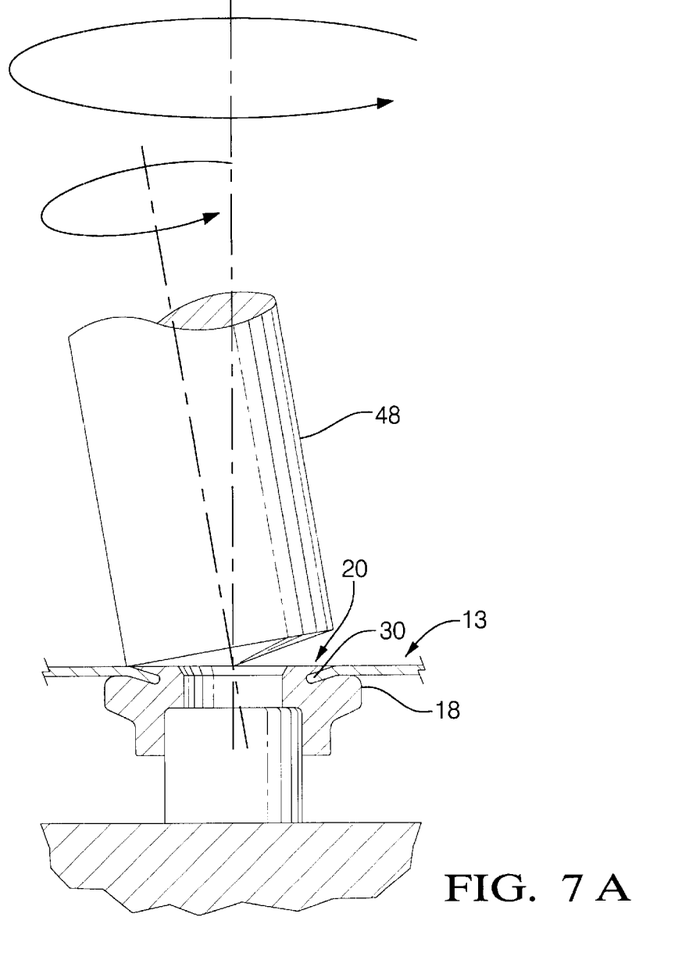
FIGS. 7A–7B illustrate an alternative method of attaching the connecting member shown in FIGS. 1 and 2 to a housing of a vacuum brake booster.
Figure 7B:
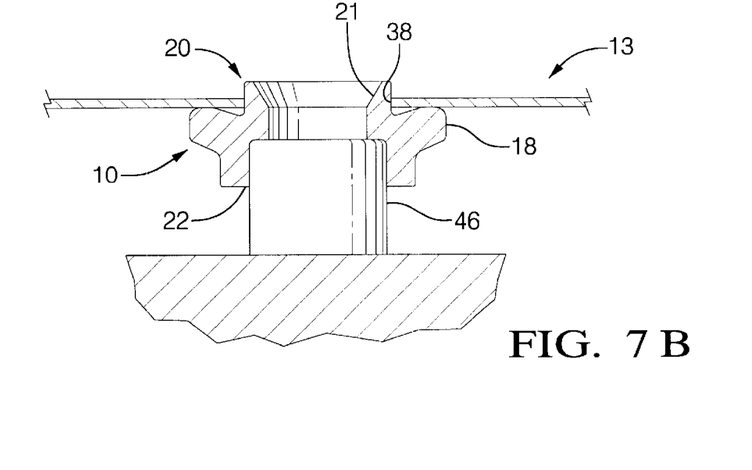

FIGS. 7A–7B illustrate an alternative method of attaching the connecting member 10 to the housing member 13. In particular, an orbital peening process is used. As shown in FIG. 7B, the stem portion 20 of the connecting member 10 is inserted through the opening 38 in the housing member 13. A support tool 46 is positioned into the first opening 22 of the connecting member 10. As shown in FIG. 7A, an orbital peening tool 48 is positioned against the stem portion 20 and applies a force to the stem portion 20, and in particular, to the tapered end portion 21. The stem portion 20 is deflected, which in turn causes the portion 30 of the housing member 13 to deflect. The deflection of the stem portion 20 secures the portion 30 of the housing member 13 against the rim portion 18.

Figure 8A:
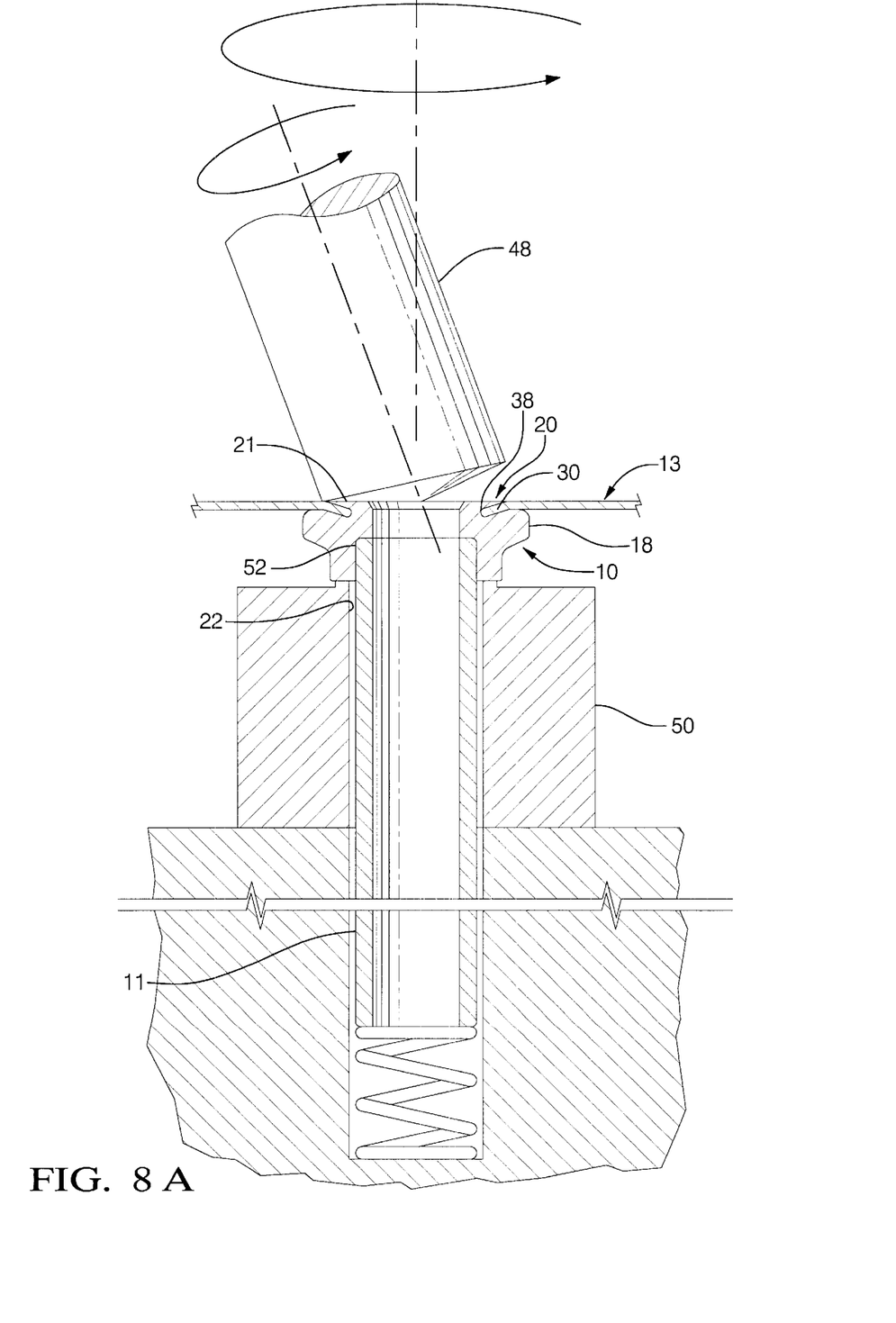
FIG. 8A illustrates a method of attaching the connecting member shown in FIGS. 1 and 2 to a housing of a vacuum brake booster and simultaneously attaching a tube member to the connecting member.
Figure 8B:
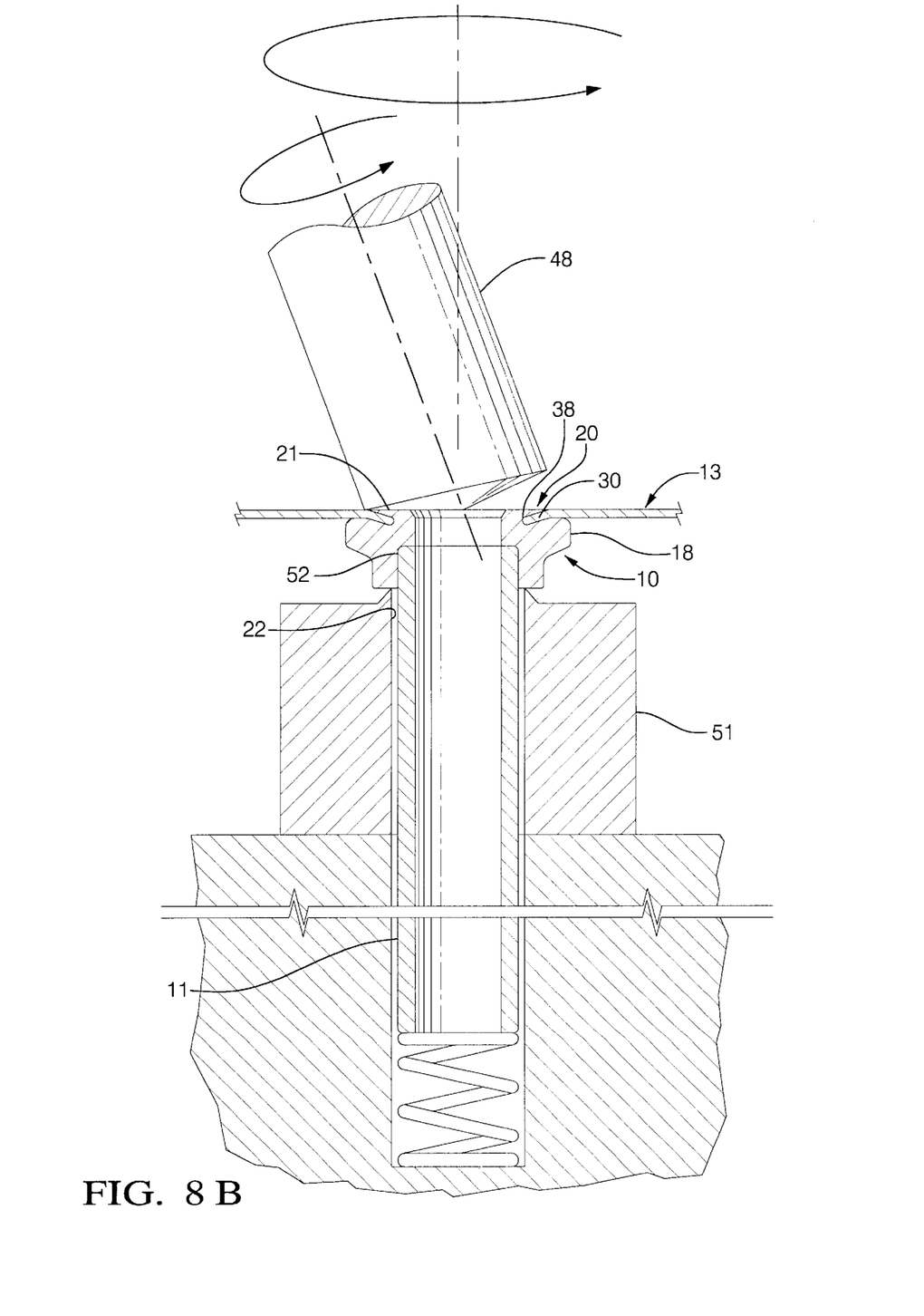
FIG. 8B illustrates the method shown in FIG. 8A with an alternative embodiment of the staking tool.

As shown in FIG. 9, once the connecting member 10 is secured to the housing member 13, the end portion 24 of the tube member 11 may preferably be press fit into the first opening 22 in the connecting member 10. Alternatively, as shown in FIG. 8A, the connecting member 10 may preferably be attached to the housing member 13, and the tube member 11 may preferably be attached to the connecting member 10 at the same time. Referring to FIG. 8A, the stem portion 20 is inserted through the housing member opening 38, and the rim portion 18 is contacted against the housing member 13. A first end portion 52 of the tube member 11 is inserted into the first opening 22 in the cylindrical body portion 12 (see FIG. 2) of the connecting member 10. As shown in FIG. 8A, an orbital peening tool 48 applies a force to the stem portion 20, and in particular to the tapered end portion 21, and the stem portion 20 is deformed to create a seal between the portion 30 of the housing member 13 and the connecting member 10. At the same time, a staking tool 50, which may preferably be positioned around the tube member 11, may contact the first end 14 of the cylindrical body portion 12. This in turn causes the rim portion 18 to be deformed against the first end portion 52 of the tube member 11 to fasten the tube member 11 to the connecting member 10, and in particular, to the cylindrical body portion 12 (see FIG. 2). The rim portion 18 may preferably be deformed against the first end portion 52 of the tube member 11 simultaneously with the deformation of the stem portion 20. FIG. 8B illustrates an alternative embodiment of a staking tool 51.

One advantage of the arrangement shown in FIGS. 8A–8B is that the connecting member 10 can be mechanically fastened to the housing member 13, and the tube member 11 can be fastened to the connecting member 10 simultaneously. Moreover, the rim portion 18 is deformed against the first end portion 52 of the tube member 11 under force, which ensures that the tube member 11 is securely fastened to the connecting member 10.

It should understood by those of ordinary skill in the art that the connecting member 10 and tube member 11 arrangement described herein may be used in a vacuum brake booster (or a pressure brake booster), which may incorporate two or more tube members each having an associated connecting member. For a given application, each connecting member and tube member arrangement may be identical, as illustrated in FIG. 4. Alternatively, for a given application, each connecting member and tube arrangement may vary. For example, in the case of a tandem booster, one connecting member and tube arrangement may be attached to an internal divider as opposed to an external housing member.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A connecting member comprising:
    a cylindrical body portion including a first end and a second end, a rim portion formed between the first end and the second end, a stem portion formed at the second end of the cylindrical body portion, the stem portion including a tapered end portion to allow the stem portion to flow radially outward when a force is applied to the stem portion, the cylindrical body portion further including a first opening formed in the cylindrical body portion adjacent to the first end of the cylindrical body portion for receiving an end portion of a tube member and a second opening in communication with the first opening, the first opening having a first diameter and the second opening having a second diameter, the second diameter being less than the first diameter wherein the stem portion is adapted to be deformed to create a seal between a portion of a housing member and the connecting member.

2. The connecting member of claim 1 wherein the rim portion and the stem portion define a recess to receive the housing member.

3. The connecting member of claim 1 wherein the rim portion extends outward from the cylindrical body portion in a direction towards the second end.

4. The connecting member of claim 3 wherein the rim portion extends outward from the cylindrical body portion approximately 25 degrees from vertical.

5. The connecting member of claim 1 wherein the cylindrical body portion is formed from a single piece of rigid material.

6. A vacuum brake booster comprising:
    a housing member, a connecting member including a cylindrical body portion including a first end and a second end, a rim portion formed between the first end and the second end, a stem portion formed at the second end of the cylindrical body portion, the stem portion including a tapered end portion, the cylindrical body portion further including a first opening formed in the cylindrical body portion adjacent to the first end of the cylindrical body portion and a second opening in communication with the first opening, the first opening having a first diameter and the second opening having a second diameter, the second diameter being less than the first diameter wherein the stem portion is deformed to create a seal between a portion of a housing member and the connecting member, a tube member including a first end portion, the first end portion of the tube member received in the first opening of the cylindrical body portion.

7. The vacuum brake booster of claim 6 wherein an outer surface of the stem portion is flush with an outer surface of the housing member.

8. A method of attaching a connecting member to a housing member of a vacuum brake booster, wherein the connecting member includes a cylindrical body portion having a first end and a second end, a rim portion formed between the first end and the second end, a stem portion formed at the second end of the cylindrical body portion, the stem portion including a tapered end portion, the cylindrical body portion further including a first opening formed in the cylindrical body portion adjacent to the first end of the cylindrical body portion and a second opening in communication with the first opening, the first opening having a first diameter and the second opening having a second diameter, the second diameter being less than the first diameter, and wherein the housing member includes an inner surface, an outer surface, and a housing member opening formed therein, and comprising the steps of:
    inserting the stem portion through the housing member opening;
    contacting the rim portion against the housing member;
    applying a force to the stem portion;
    flowing the stem portion radially outward; and
    deforming the stem portion to create a seal between a portion of the housing member and the connecting member.

9. The method of claim 8 further comprising the steps of:
    applying a force to the tapered end portion of the stem portion.

10. The method of claim 8 further comprising the steps of:

contacting the rim portion against the inner surface of the housing member.

11. The method of claim 10 wherein the rim portion and the stem portion define a recess and further comprising the steps of:

deflecting the portion of the housing member into the recess;

contacting the portion of the housing member against the rim portion; and;

contacting the stem portion against the portion of the housing member.

12. The method of claim of claim 11 further comprising the steps of:

contacting the stem portion against the outer surface of the housing member.

13. A method of attaching a tube member to a housing member of a vacuum brake booster comprising the steps of:

providing a connecting member including a cylindrical body portion having a first end and a second end, a rim portion formed between the first end and the second end, a stem portion formed at the second end of the cylindrical body portion, the stem portion including a tapered end portion, the cylindrical body portion further including a first opening formed in the cylindrical body portion adjacent to the first end of the cylindrical body portion and a second opening in communication with the first opening, the first opening having a first diameter and the second opening having a second diameter, the second diameter being less than the first diameter, the tube member including a first end portion, and the housing member including an inner surface, an outer surface, and a housing member opening formed therein;

inserting the stem portion through the housing member opening;

contacting the rim portion against the housing member;

inserting the first end portion of the tube member into the first opening in the cylindrical body portion;

applying a force to the stem portion;

flowing the stem portion radially outward;

deforming the stem portion to create a seal between a portion of the housing member and the connecting member; and deforming the rim portion against the first end portion of the tube member to fasten the tube member to the cylindrical body portion.

14. The method of claim 13 wherein the rim portion is deformed against the first end portion of the tube member simultaneously with the deformation of the stem portion.

15. The method of claim 13 further comprising the steps of:

providing a staking tool;

positioning the staking tool around the tube member; and contacting the first end of the cylindrical body portion against the staking tooling.

* * * * *